(No Model.) 2 Sheets—Sheet 2.

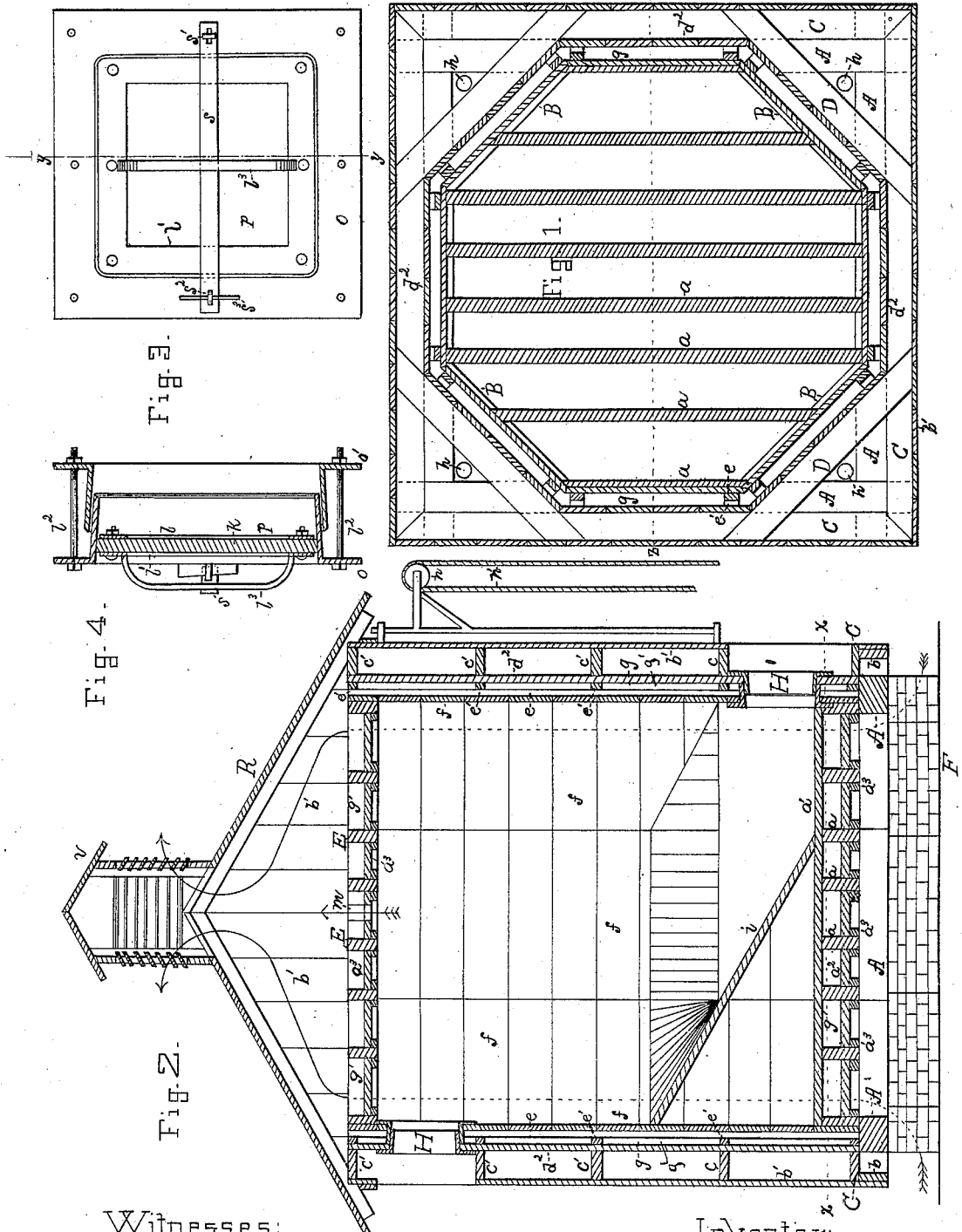

T. T. MOULTON.
LIME BIN.

No. 302,858. Patented July 29, 1884.

Witnesses:
Peter P. Adams
Howard Moulton

Inventor:
Truman T. Moulton
by G. H. Albee
his Attorney

UNITED STATES PATENT OFFICE.

TRUMAN T. MOULTON, OF NEENAH, WISCONSIN.

LIME-BIN.

SPECIFICATION forming part of Letters Patent No. 302,858, dated July 29, 1884.

Application filed September 29, 1883. (No model.)

*To all whom it may concern:*

Be it known that I, TRUMAN T. MOULTON, a citizen of the United States, residing at Neenah, in the county of Winnebago and State of Wisconsin, have invented certain new and useful improvements in structures for storing, preserving, and transporting lime, whereby it may be kept from deteriorating in its cementing qualities by exposure to atmospheric influences, of which the following is a specification.

This improved structure is designed for the permanent storage of the freshly-burned lime, and also for its shipment upon cars, boats, or other vehicles of transportation; and it consists of comparatively air-tight walls, floor, and covering composed of such material and so combined as to effectually exclude atmospheric influence tending to injuriously affect the lime, and doors through which it is deposited and removed, and frames therefor containing like qualities, the structure having means for its ventilation and the reduction of the temperature of the air surrounding it.
I attain these objects by the means and arrangement thereof illustrated in the accompanying drawings, in which—

Figure 5:
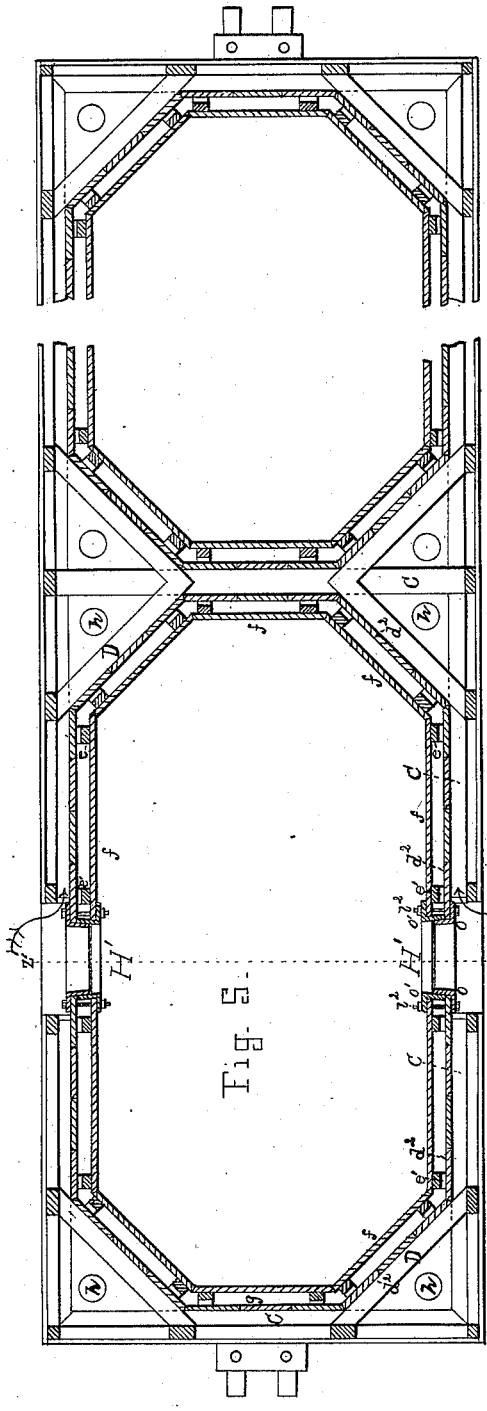
Figure 6:
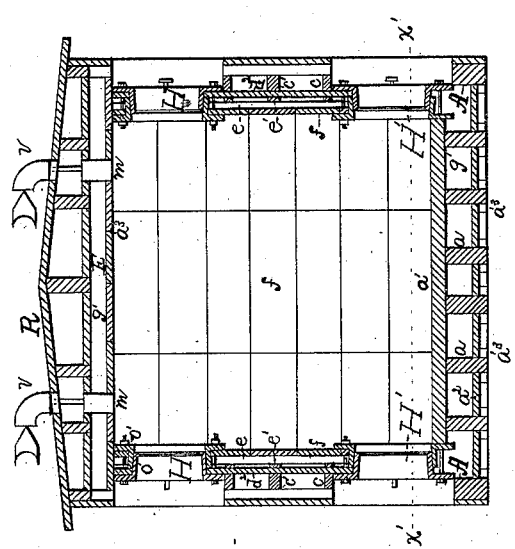
Figure 7:
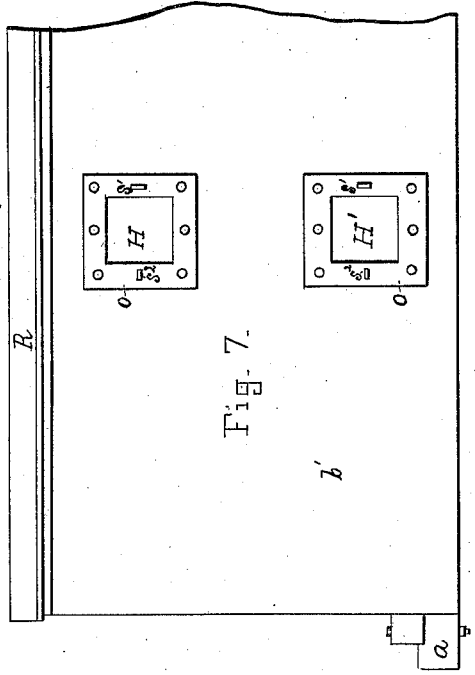

Figure 1 is a plan, partly in section, of the structure as constructed for storage purpose below the line $x\,x$ of Fig. 2. Fig. 2 is a vertical section of the completed structure upon the line $z\,z$ of Fig. 1. Fig. 3 is a plan of one of the doors and their frame upon an enlarged scale, as constructed for closing the receiving and discharging openings. Fig. 4 is a vertical section of the same upon the line $y\,y$ of Fig. 3. Fig. 5 is a plan, partly in section upon the line $x'\,x'$ of Fig. 6, showing one form of the improved structure as applied to a car for the transportation of lime when its shipment to distant points is required. Fig. 6 is a vertical section of the same upon the line $z'\,z'$ of Fig. 5; and Fig. 7 is a side view of part of a car, showing the location of the doors.
Similar letters of reference indicate corresponding parts in the several views.

Referring to Fig. 1, A represents sills of the structure locked together, and their ends projecting a few inches beyond their outer edge, as I prefer making it when formed of wood, which I find the cheapest material and best suited to preserve the lime when used as the principal element in its construction.

B B B B are pieces of timber framed into the sills A, and their ends projecting like them to the same extent, and forming with them upon its interior a frame of octagonal form.

Upon the projecting ends of A and B are secured the joists or plank $b$, and to A, B, and $b$ are fastened the plank C, upon which is secured the plank D, which forms with C an octagon a few inches in size larger than the one formed with A and B.

$c$ and $d$ are pieces of similar material firmly secured to each other, and forming, like C and D, an octagon of like dimensions, and placed at the required distance above C and D, respectively.

$c'$ and $d'$ ($d$ and $d'$ are not shown in the drawings, being directly over D) are other frames of corresponding size and form, in number and at the distance above $c$ and $d$, and from each other, as required for the desired height and strength of the bin or structure.

$a\,a\,a$ are floor-joists resting upon the sills A and B, and upon which is laid the floor $a'$. At the lower edge of the joists are secured strips $a^3$, upon which is laid the floor $a^2$, forming a space between the two floors, which is filled with some material $g'$, adapted to exclude air and moisture.

$b'$ are boards secured to the pieces $b$, C, $c$, and $c'$ in a perpendicular position, and constituting the outer covering upon the four sides of the structure. Over the entire structure is placed the roof R, which may be of any desired material. Battens (not represented in the drawings) may cover the joints of the outside boarding; or, if desired, bricks or other material may be used in the formation of the outer walls, in order to produce a fire-proof structure and one comparatively free from external effects.

$d^2$ are boards matched or otherwise placed together in an upright position, forming comparatively tight joints, and secured to the inside of the octagonal frames C D, $c\,d$, and $c'\,d'$.

$e$ are strips, of two inches, more or less, in thickness, fastened to the inside of the wall $d^2$ in a perpendicular position, and having block $e'$, one inch or so in thickness, between it and said walls.

$f$ are boards fastened to strips $e$ in a horizontal position, and forming a space, $g$, between them and the boards $d^2$, (except the space occupied by blocks $e'$,) in which a filling, $g'$, of slaked lime, ashes, fine sawdust, or other material is placed.

E E are joists resting on the plates of the bin, betweeen which are laid boards forming a floor similar to the floor $a^2$, and having upon it like filling material, thus forming an airtight protection entirely around the inner inclosure, except entrance and exit openings, as will be hereinafter explained.

The foundation F of the octagonal bin or structure is built in a form corresponding with it, upon which rest the sills A and B. The corners of the rectangle from which said octagon is formed have their bases exposed to the outer air and its unrestricted circulation.

Between the outer wall, $b'$, of the structure and the boards $d^2$, which form the outer wall of the octagonal bin, are air-spaces $g$, entirely surrounding said bin, the fresh air entering said spaces at each corner through openings $h$, ascending and circulating between the bands C D, $c d$, and $c' d'$, and passing into the upper part and escaping to the outside through the ventilator $v$, as indicated by the arrows. There may be also additional air-holes at any point desirable for its admission to the spaces aforesaid and escape therefrom, and those apertures may have directing-covers governed by the force of the wind or otherwise, for producing the desired result. Ventilating-ducts $m$, with means for their closure at option, extend through the top of the inner bin to the space above it, for the escape of moisture and the gases formed, if found to exist, during the storage of the lime.

Where the location of the structure permits of the discharge of the lime being at all times made from one of its sides, an inclined floor, $i$, is placed in position for directing it toward said discharging-point. The sides of the bin are also formed for the direction of its contents toward said point, and its sides being numerous, resulting from its form, prevent the contents from finding lodgment in its corners. Doors may be applied to the openings in the outer wall leading to the doors of the inner walls, if desired.

The receiving openings H may be upon any one or more of its sides, both the receiving-openings H and discharging-openings H' having door-frames of rectangular form, their outside end, when placed in position, being of larger area than their inner one, as shown in Fig. 4. They are preferably composed of iron, cast in two parts, $o$ $o'$, in form rectangular, tapering, and flanged, one part, $o$, fitting within the other, $o'$, and their interior corners rounded slightly, as shown in Fig. 3. The two parts are inserted in openings of the wall designed for them, one part, $o$, upon the exterior, the other, $o'$, upon the interior thereof, and clamped tightly to the walls and to each other by the bolts $l^2$, a packing of suitable material being inserted for producing tight joints.

The doors $p$ are composed preferably of paper board of the desired thickness or number of layers fitted accurately to the door-frame. Upon the sides are clamping-frames $l$ $l'$, between which the paper is secured. The inside surface of the lower or discharging doors should have an iron plate covering its surface, for protection against falling pieces of lime. The doors are secured in the frame $o$, and the opening made air-tight by means of a spring-bar, $s$, fulcrumed upon the bolt $s'$, passing over the door-handle $l^3$, and confined by a wedge in the staple $s^2$. The doors may also be attached to the frame by hinges of suitable construction or otherwise.

The walls of the inner bin, in which is contained the lime, may be composed of iron, brick, or other material applicable to the local conditions, and it may be of circular or polygonal form upon the plane of its base.

Upon the outside of the discharging-doors, at a convenient point, is located a crane, $n$, having a pulley with a rope, $n'$, thereon, and attached to a measure or receptacle, which receives the lime as it is discharged from the bin. Said receptacle is raised or lowered, as required, swung around and emptied into the desired vehicle or receptacle. By the application of a chute to the receiving-doors this crane and appliances are equally advantageous for the storage of the lime, thereby lessening the manual labor required in its transfer into and out of the bin or structure. The crane may be detachable, and thereby easily and quickly applied to the desired point.

In the application of these improvements to an ordinary box-car for the transportation of lime, few changes in its outward construction are required. The car is provided with double floors both above and below the inner bin and double walls around it, each containing a filling of like material, as in one for storage purposes. The octagonal form is preferable to the rectangular, as giving more strength and a better circulation of air around the inner bin. It is desirable that the apertures for the admission of air around the inner bin be so placed and of such outward form that a strong current of air will be produced by the forward movement of the train and continue to circulate around its sides and over its top while said movement continues, thereby reducing the temperature of its surrounding air and removing the moisture therefrom, which is so detrimental to the preservation of its contents. The same arrangement of the several parts forming the interior walls, air-spaces, and spaces to be filled with an air and moisture excluding material, entrance and exit openings for air, is observed as if for storage purposes. Openings for the admission of air to the aforesaid spaces may also be made at the sides of the doors to the inner bin, as shown by the arrows in Fig. 5. Said doors may be enlarged for the entrance of freight of various kinds.

I am aware that lime-bins have been constructed having walls of double or triple thickness, the intermediate spaces being filled with slaked lime or ashes, and also having dead-air spaces surrounding said walls and filling, and that sheathing paper or felt has been used in their construction, neither of which I claim as new; but

What I claim as my invention, and desire to secure by Letters Patent, is—

1. A bin or structure for the storage and preservation or transportation of lime, of circular or polygonal form upon the plane of its base, having comparatively air-tight walls, floor, and covering, and having doors for the reception and discharge of its contents with like air-tight qualities, substantially as described.

2. A bin or structure for the storage and preservation or transportation of lime, of circular or polygonal form upon the plane of its base, and having comparatively air-tight walls, floor, and covering, and having doors with like air-tight qualities, and surrounding said walls, a rectangular structure, and a roof to the same, and a space within it for the circulation of air, and openings near the base for its admission, and near the top for its escape, and also openings through said walls to the doors aforesaid, substantially as set forth.

3. The combination, in a structure for the storage and preservation or transportation of lime, of the following elements: substantially air-tight walls having doors therein, a comparatively air-tight floor and covering, an outer wall and covering provided with spaces within the same for the circulation of air, and openings through said walls for its admission and escape, and also having openings through said walls to the aforesaid doors, substantially as described.

4. The combination, in a structure for the storage or transportation and also preservation of lime, of the following elements: comparatively air-tight walls having doors therein, a comparatively air-tight floor and covering, said covering having ventilating openings, with means for their closure at option, therein, an outer wall and covering provided with spaces within the same for the circulation of air, and openings for its admission and escape, and also having openings through said outer wall to the doors aforesaid, substantially as set forth.

5. The combination, with a lime bin or structure for its storage and preservation or transportation, of a door-frame formed in two parts, said parts being in form the frustum of a rectangular pyramid, one of which parts is surrounded by a flange at right angles with its axis upon its larger end, the other by a like flange upon its smaller end, the pyramidal part of the former entering that of the latter and retained therein and to the walls of the structure by bolts, substantially as shown and described.

6. The combination, with a lime bin or structure for its storage and preservation or transportation, of a door having a central body of paper, felt, rubber, or any material comparatively unaffected by atmospheric influences, and secured between clamps $l\ l'$, substantially as shown and set forth.

7. The combination, in a lime bin or structure for its storage and preservation or transportation, of the door-frame $o\ o'$, the bolts $l^2$, the door $p$, having the handle $l^3$, the spring $s$, the bolt $s'$, the staple $s^2$, and the wedge $s^3$, substantially as described.

8. The combination, in a lime bin or structure for its storage and preservation or transportation, of the foundation F, sills A B $b$, joists $a$, floor $a^2\ a'$, walls $b'\ d^2\ f$, the bands C D, $c\ d$, and $c'\ d'$, joists E, floor-strips $a^3$, filling $g'$, roof R, ventilating-openings $h\ v$, and receiving and discharging openings H H′, substantially as described and shown.

TRUMAN T. MOULTON.

Witnesses:
HOWARD MOULTON,
PETER P. ADAMS.